Figure 1:
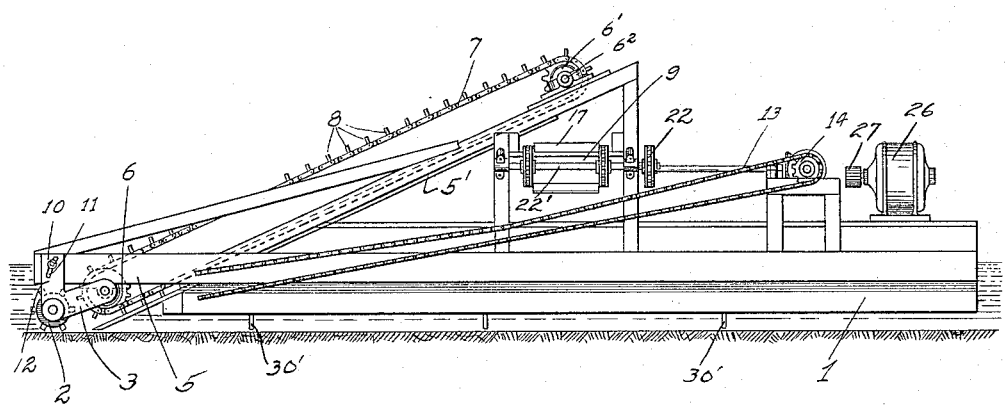

A. SCHILLING.
GRADING, HARVESTING, AND RECOVERING SALT.
APPLICATION FILED DEC. 13, 1912.

1,160,533.

Patented Nov. 16, 1915.
2 SHEETS—SHEET 1.

WITNESSES:

INVENTOR
August Schilling
BY
ATTORNEY

A. SCHILLING.
GRADING, HARVESTING, AND RECOVERING SALT.
APPLICATION FILED DEC. 13, 1912.

1,160,533.

Patented Nov. 16, 1915.

2 SHEETS—SHEET 2.

Fig. 3

UNITED STATES PATENT OFFICE.

AUGUST SCHILLING, OF OAKLAND, CALIFORNIA.

GRADING, HARVESTING, AND RECOVERING SALT.

1,160,533. Specification of Letters Patent. Patented Nov. 16, 1915.

Application filed December 13, 1912. Serial No. 736,537.

*To all whom it may concern:*

Be it known that I, AUGUST SCHILLING, a citizen of the United States, residing at Oakland, in the county of Alameda and State of California, have invented certain new and useful Improvements in Grading, Harvesting, and Recovering Salt, of which the following is a specification.

The hereinafter described invention relates to an improved apparatus for the treating of salt within a salt pond or ponds for the mechanical grading, harvesting, and recovering the salt therefrom. By the expression grading is meant preparing the salt within the salt pond or ponds for determining the size of the crystals to be recovered therefrom, while by the expression harvesting is meant the removal of the salt crystals from within the pond.

The object of the present invention is to permit salt ponds of large acreage to be utilized for the deposit of the salt crystals and the recovery of the salt therefrom, to control or regulate the size or fineness of the salt within different ponds, and to recover the salt from the pond or ponds by mechanical automatically operated means in lieu of the manually operated means at present employed for the recovery of the salt and by dispensing with the manually operated means, avoiding the slow, uncertain and expensive work at present required for this purpose.

Ordinarily the salt ponds are of small area and workmen with shovels are employed for removing and elevating the salt or salt crystals from the bottom of the salt ponds, the salt so displaced being thrown into a wheel barrow until a load is secured, which is then wheeled to the shore and discharged at a suitable place of deposit. This is not only a slow, tedious and expensive method of collecting and removing the salt, but the same does not insure a uniform removal of the salt or salt crystals from the salt pond and therefore is not productive of the best results and economic working of the material.

From the salt water or brine admitted into the pond or ponds for the recovery of salt, the salt crystals will form, and gather at the bottom of the pond and grow or gradually increase in size by the deposit of other crystals thereon. If these growing crystals are broken up within the pond at frequent intervals during the salt making season, crystals of small size result, while the less they are disturbed the larger will be the size of the crystals. It will therefore be observed that in various ponds the size of the crystals may, by the use of the hereinafter described invention, be regulated in accordance with the wish of the manufacturer of the commercial salt.

To comprehend the invention reference should be had to the accompanying sheets of drawings, wherein—

Figure 2:
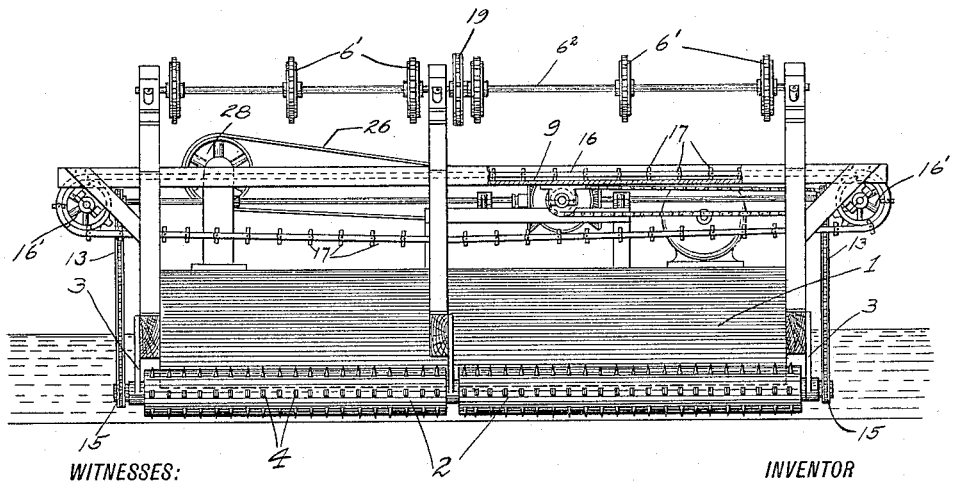

Figure 1 is a side elevation of the improved apparatus, disclosing the relative position of the associated instrumentalities. Fig. 2 is a front elevation of the apparatus illustrating the cutting or breaking devices for the salt crystals, and the discharge apron and conveyer for receiving the broken or cut salt or salt crystals, the elevator for receiving the salt from the cutting and breaking device and elevating and delivering the same onto the discharge conveyer being removed. Fig. 3 is a plan view of the apparatus illustrating the position of the various working parts and the mechanism for imparting motion thereto.

In the drawings, the numeral 1 is used to designate any suitable form of a supporting structure capable of sustaining the working mechanism and having sufficient buoyancy to draw but slight water when placed within the salt pond, say, approximately twelve inches;—the buoyant structure being approximately twelve by eighteen feet over all, and preferably constructed of wood.

At the forward end of the buoyant structure is arranged, in the present case, a pair of alined cutting rollers 2, which rollers are mounted in the swinging or adjustable bearing brackets 3, in order to provide for vertical adjustment to regulate the depth of submergence for the said rollers. While any suitable form of cutting devices may be employed, preference is given to the cylinder rollers 2 provided with a series of circumferentially disposed and outwardly projecting cutting blades or instrumentalities. As stated, the rollers 2 are mounted for rotation in the bearing brackets 3, which brackets are hinged or pivoted to the lower end portion of the side beams 5 secured to the supporting structure 1, and over sprocket wheels 6 and 6' mounted in bearings at the upper and lower ends of the inclined table 5' work the endless carrier chains 7, which are connected by the cross pieces, blades or plates 8. The lower end of the inclined table terminates immediately back of the rotary cutters 2 and receives thereon the salt or salt crystals thrown rearwardly from the rotary cutter, and the said received salt is carried up the inclined table 5' by the projecting blades or plates 8 which rest on and move upwardly over the surface of the said inclined table and serve as drags for elevating such material to carry the same over the upper end of the said table for discharge onto the transversely disposed runway 9.

The swinging bearing brackets 3 are held in adjusted position by means of the lock clamp bolts or studs 10, which work through the slotted portion 11 of the projecting arm 12 of said brackets and screw into or rather are attached to the forward end portion of the supporting structure 1. Rotation is imparted to the excavating rollers 2 mounted in said bearing brackets by means of the drive chains 13 which work over the sprocket wheels 14 on the shaft 18, and the sprocket wheels 6 and similar wheels 15 secured to the axle 15' for the rollers 2.

The transversely disposed runway 9 is located below the upper end of the inclined table 5' and receives the salt discharged therefrom, which salt is removed by means of an endless carrier which consists of the endless sprocket chains 16 working over sprocket wheels 16' at each end of the said runway. These sprocket chains are connected by the slats, blades or cross-pieces 17, which serve as drags for the removal of the material during the endless travel of the chains 16.

The drags 8 and 17 not only serve for raising the salt crystals or material up the inclined table 5' and propelling the same along the runway 9 respectively, but answer to break up any of the large size crystals which may be delivered by the rotary cutters.

The shaft $6^2$ at the upper end of the inclined table 5' for the sprockets 6' is driven from a drive shaft 18 by means of a sprocket chain 18' working over the sprocket wheels 19 and 19' mounted on the shaft $6^2$ and 18 respectively, and the carrier chains 16 for the drags 17 are driven from a shaft 20 by means of a sprocket chain 20' working over the sprocket wheels 21 and 22 mounted respectively on said shaft, and one of the axles 22' for the sprocket wheels 16', the said power shaft 20 at its outer end carrying a bevel gear 23 in meshed engagement with which the bevel gears 24 and 24' carried by the spool 25 slidably mounted on the drive shaft 18 are thrown for transmitting rotation thereto from the said drive shaft, the direction of rotation transmitted to the shaft 20 and from the same to the carrier chains 16 depending on which of the bevel pinions or gears 24 and 24' are thrown into mesh with the pinion or gear 23 of the power shaft 20.

Motion is imparted to the drive shaft 18 from a motor 26 by means of a belt 26' working over a belt pulley 27 on the motor shaft 27' and a belt pulley 28 on a shaft 28' carrying a worm 29 in mesh with a worm gear 29' on the outer end of the drive shaft 18.

The ends of the runway 9 project beyond the sides of the supporting structure a distance sufficient for a small barge or other buoyant structure to be run alongside the supporting structure 1 to receive the salt discharged from the runway 9. As soon as one such receiving barge is loaded, the direction of travel of the endless carrier chains 16 is reversed so as to discharge material from the opposite end of the runway 9 into a receiving structure situated at such side of the supporting structure 1. This reversing of the direction of the travel of the endless carrier chains 16 is produced by a shifting of the slidable spool 25 through the medium of the clutch 30 on the drive shaft 18.

The grading and harvesting apparatus is moved back and forth over the surface of the salt pond in any suitable manner, and as moved and submerged excavating rollers or devices carried thereby cut the crystals of salt deposited within the pond and throw the same onto the inclined table 5' over which the same are upwardly propelled by the drag plates 8 and discharged over the upper end of the said table into the runway 9, from which the same are discharged by the endless drag working therein into or onto any suitable form of a receiver situated at one or both sides of the supporting structure for this purpose.

In the operation of grading the salt crystals within the salt pond or ponds the apparatus is moved thereover with the drive mechanism for the elevating devices disconnected, with the result that the cutters or breaking-up devices act on the formed mounds of salt crystals in order to break up the same, while the scrapers 30' projecting below the buoyant structure during the traveling movement thereof level the loosened salt. As stated, the fineness or size of the salt crystals is controlled or regulated by the number of times the apparatus is passed over the deposited salt bed within the pond or ponds for breaking up the formed crystals. During the harvesting operation of the salt, the elevating devices or mechanism is placed into operation, the same removing and elevating the salt crystals in the manner before described.

By the use of the described apparatus—salt ponds of exceedingly large area may be employed, thereby materially reducing the money investment or working capital required for the maintenance of a large number of ponds of small area, and also avoiding the heavy expense incident to the recovery of the salt by manually operated devices.

As the salt crystals are removed from a body of brine solution substantially full to saturation, the crystals are thoroughly washed and freed of all dirt and foreign substance as elevated through such a body of brine solution, which, while not dissolving the salt crystals, removes therefrom or takes out any of the baser magnesium salts which are present in the salt as ordinarily removed by shovels or similar devices in an unbroken body.

The described apparatus not only breaks up the salt crystals by a harrowing operation, but permits of the harvesting of the salt and at the same time accomplishing the washing thereof for the removal of the baser magnesium salt contained therein.

The apparatus will be found of the utmost importance where the salt is to be handled on a large scale, inasmuch as it permits not only economic working thereof, but the efficient treatment thereof in a manner never before carried out.

I am aware that changes may be made in the details of construction of the various working parts of the described apparatus without departing from the spirit of the invention, and I do not wish to be understood as confining or limiting myself to the details shown and described. I am also aware that the distance of the buoyant structure from the bottom of the pond may be increased or decreased by admitting additional water into the pond or withdrawing water therefrom, or by pumping water into and out of the said structure.

Having thus described the invention what is claimed as new and desired to protect by Letters Patent is—

1. In a salt grading apparatus the combination with a buoyant frame a grader carried by said frame and positioned for operation upon the salt below said frame, means for actuating the grader and means associated with said frame and adjacent the grader for leveling salt below the bouyant frame after the same has been acted upon by the grader.

2. In a salt grading apparatus, the combination with a buoyant frame, of a rotary grader carried by said frame, means for maintaining the grader in a position to operate upon salt below said buoyant frame, means for actuating the grader, and means comprising a series of space leveling blades depending from the frame for leveling the salt below said frame after the salt has been loosened by the grader.

3. In the salt grading and recovering apparatus the combination with a buoyant frame comprising spaced side bars and a connecting base portion, of a rotary grader carried by the side bars, said grader journaled in substantially the same plane as the base of the frame, a traveling conveyer having a receiving end portion adjacent the rotary grader to receive salt loosened by the rotary grader, and means associated with the frame for leveling the salt below said buoyant frame immediately after the same has been actuated on by the grader.

In testimony whereof I have signed my name to this specification in the presence of two subscribing witnesses.

AUGUST SCHILLING.

Witnesses:
D. G. VOLKMANN,
PAUL LESSOW.

Copies of this patent may be obtained for five cents each, by addressing the "Commissioner of Patents, Washington, D. C."